US008904457B2

(12) United States Patent
Sood et al.

(10) Patent No.: US 8,904,457 B2
(45) Date of Patent: Dec. 2, 2014

(54) ARCHIVING A LIVE MEDIA PRESENTATION (71) Applicant: Microsoft Corporation, Redmond, WA (US)

(72) Inventors: Vishal Sood, Bothell, WA (US); Krishna P. Duggaraju, Redmond, WA (US); Geqiang Zhang, Woodinville, WA (US); Anton Kucer, Remond, WA (US); Raymond W. C. Cheng, Sammamish, WA (US); Jimin Gao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 31 days.

(21) Appl. No.: 13/729,467

(22) Filed: Dec. 28, 2012

(65) Prior Publication Data

US 2014/0189761 A1    Jul. 3, 2014

(51) Int. Cl.
*H04N 7/173* (2011.01)
*H04N 21/262* (2011.01)
*G06F 15/16* (2006.01)

(52) U.S. Cl.
CPC .............. *H04N 21/26283* (2013.01)
USPC ........................... 725/92; 709/231

(58) Field of Classification Search
CPC .................................... H04N 21/218
USPC ............................. 725/92, 115, 145
See application file for complete search history.

(56) References Cited

U.S. PATENT DOCUMENTS

| 6,115,035 | A | 9/2000 | Compton et al. |
| 7,076,478 | B2 | 7/2006 | O'Rourke et al. |
| 7,912,217 | B2 | 3/2011 | Baugher et al. |
| 8,051,445 | B2 | 11/2011 | Barrett et al. |
| 8,078,696 | B2 | 12/2011 | LaJoie et al. |
| 8,108,257 | B2 | 1/2012 | Sengamedu |
| 2005/0278759 | A1* | 12/2005 | Unger .............................. 725/89 |
| 2008/0307454 | A1 | 12/2008 | Ahanger et al. |
| 2009/0089401 | A1 | 4/2009 | Zhang et al. |
| 2009/0297123 | A1* | 12/2009 | Virdi et al. ....................... 386/69 |
| 2010/0114921 | A1 | 5/2010 | Bocharov et al. |
| 2010/0146542 | A1 | 6/2010 | Weihs et al. |

(Continued)

OTHER PUBLICATIONS

"HTTP Dynamic Streaming on the Adobe® Flash® Platform", Retrieved at<<https://bugbase.adobe.com/index.cfm?event=file.view&id=2943064&,seqNum=6&name=httpdynamicstreaming_wp_ue.pdf>>, Proceedings of the Adobe Flash Platform Technical White Paper, Retrieved Date Oct. 17, 2012, pp. 18.

(Continued)

*Primary Examiner* — Michael M Nguyen
*Assistant Examiner* — Tien M Nguyen (57) ABSTRACT

A computer-implemented method for archiving a live media presentation includes archiving the live media presentation as it is being streamed from a live server, wherein the archiving includes recording the live media presentation in fixed-length segments. A segment name is associated with each of the segments, wherein each of the segment names includes a time stamp. The fixed-length segments are stored on a video on-demand (VOD) server. A manifest is generated that describes at least a portion of the live media presentation and identifies a uniform resource locator (URL) to be used by a client device to access a first one of the segments, wherein the URL includes the segment name of the first segment.

18 Claims, 8 Drawing Sheets

(56) References Cited

U.S. PATENT DOCUMENTS

| | | | |
|---|---|---|---|
| 2010/0180011 A1 | 7/2010 | Sood et al. | |
| 2010/0235472 A1 | 9/2010 | Sood et al. | |
| 2010/0235528 A1* | 9/2010 | Bocharov et al. | 709/231 |
| 2010/0319017 A1 | 12/2010 | Cook | |
| 2011/0080940 A1* | 4/2011 | Bocharov et al. | 375/240.01 |
| 2011/0083037 A1 | 4/2011 | Bocharov et al. | |
| 2011/0096828 A1* | 4/2011 | Chen et al. | 375/240.02 |
| 2011/0161485 A1 | 6/2011 | George et al. | |
| 2011/0231660 A1* | 9/2011 | Kanungo | 713/168 |
| 2011/0296109 A1 | 12/2011 | Sood et al. | |
| 2011/0307781 A1 | 12/2011 | Sood et al. | |
| 2012/0002717 A1* | 1/2012 | Ma et al. | 375/240.01 |
| 2012/0023251 A1 | 1/2012 | Pyle et al. | |
| 2012/0174152 A1 | 7/2012 | Ye et al. | |

OTHER PUBLICATIONS

Goodman, Grant., "Delivering Live Streaming Video with DVR", Retrieved at<<http://support.brightcove.com/en/docs/delivering-live-streaming-video-dvr>>, Retrieved Date Oct. 17, 2012, pp. 8.

"Leightronix", Retrieved at<<http://www.leightronix.com/products_labvault_sd.php#>>, Aug. 24, 2010, pp. 2.

"Digital Media and Video Surveillance Design", Retrieved at<<http://www.cisco.com/en/US/docs/solutions/Enterprise/Education/SchoolsSRA_DG/SchoolsSRA_chap8.pdf>>, Retrieved Date Oct. 17, 2012, pp. 34.

"Delivering Live and On-Demand Smooth Streaming", Retrieved at<<http://download.microsoft.com/download/4/E/5/4E599FBB-6E34-4A74-B3C5-1391CB0FD55F/Delivering_Live_and_On-Demand_Smooth_Streaming.pdf>>, Jul. 2, 2010, pp. 28.

Markanda, et al., "Dynamic Ad-insertion in Hybrid Content Delivery Networks", Retrieved at<<http://www.techmahindra.com/Documents/WhitePaper/DynamicAdInsertioninHybridCDN_Sept10.pdf>>, Proceedings of the in white papers of Tech Mahindra, Sep. 2010, pp. 10.

"Emerging IPTV Advertising Opportunities", Retrieved at<<http://next-generation-communications.tmcnet.com/topics/innovative-services-advanced-business-models/articles/42283-emerging-iptv-advertising-opportunities.htm>>, Oct. 8, 2008, pp. 11.

\* cited by examiner

ARCHIVING A LIVE MEDIA PRESENTATION

BACKGROUND

Streaming media is multimedia that is constantly received by, and normally presented to, an end-user (using a client) while it is being delivered by a streaming provider (using a server). Streaming can be accomplished using stateless communication between the client and server by breaking media up into chunks that are individually addressable and can be individually requested by clients. For a particular media event or content item, the streaming server provides a manifest file that describes each of the chunks that comprise the event. For example, a one-minute video may include 60 one-second audiovisual chunks. Each chunk contains metadata and media content.

The metadata may describe useful information about the media content, such as the bit rate of the media content, where the media content fits into a larger media element, a codec used to encode the media content, and so forth. The client uses this information to place the chunk into a storyboard of the larger media element and to properly decode and playback the media content. The chunks can be in any format, such as Motion Picture Experts Group (MPEG) 4 boxes or other containers. A client plays a media event to a user by reading the manifest and regularly requesting chunks from the server. The user may also skip around (e.g., seek, fast forward, rewind) and the client can provide these behaviors by requesting later or earlier chunks described by the manifest. For live events, the server may provide the manifest to the client piecemeal, so that the server informs the client of newly available chunks as they become available.

SUMMARY

There are a couple of problems that most live streaming solutions have today. First, there is no easy way to take a live archive and publish it for on-demand by moving to a video on-demand (VOD) store. Second, there is a limited digital video recorder (DVR) window available (the client does not have the capability to seek far back into the past). Embodiments disclosed herein address these problems by providing a new archiving scheme that enables moving of archives to a different store/server and publishing them as VOD assets. Embodiments disclosed herein provide "Infinite DVR" capabilities, where the end user can essentially seek back into the past limited only by when the live TV Station started streaming, without adding much extra strain on the network.

One embodiment is directed to a computer-implemented method for archiving a live media presentation. The method includes archiving the live media presentation as it is being streamed from a live server, wherein the archiving includes recording the live media presentation in fixed-length segments. A segment name is associated with each of the segments, wherein each of the segment names includes a time stamp. The fixed-length segments are stored on a video on-demand (VOD) server. A manifest is generated that describes at least a portion of the live media presentation and identifies a uniform resource locator (URL) to be used by a client device to access a first one of the segments, wherein the URL includes the segment name of the first segment. In one embodiment, the steps of the method are performed by at least one processor.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

One embodiment is directed to an archiving scheme that allows for archiving in segments, with each segment being uniquely addressable. The unique addressing scheme for each segment allows downstream proxies to utilize already cached data when the content is moved from live to VOD. In one embodiment, any link cached downstream by a proxy is not affected by the moving of assets from live to VOD. Embodiments disclosed herein provide the ability on the client to compute the right segment to download and play based on seek location. Embodiments disclosed herein also provide the ability to offer electronic program guide (EPG) capabilities on top of long running streams by just using metadata on top of archived segments. Embodiments disclosed herein provide the ability to move the content from live to VOD servers at a determined pace, which can be really short durations, without impacting end users.

Figure 1:
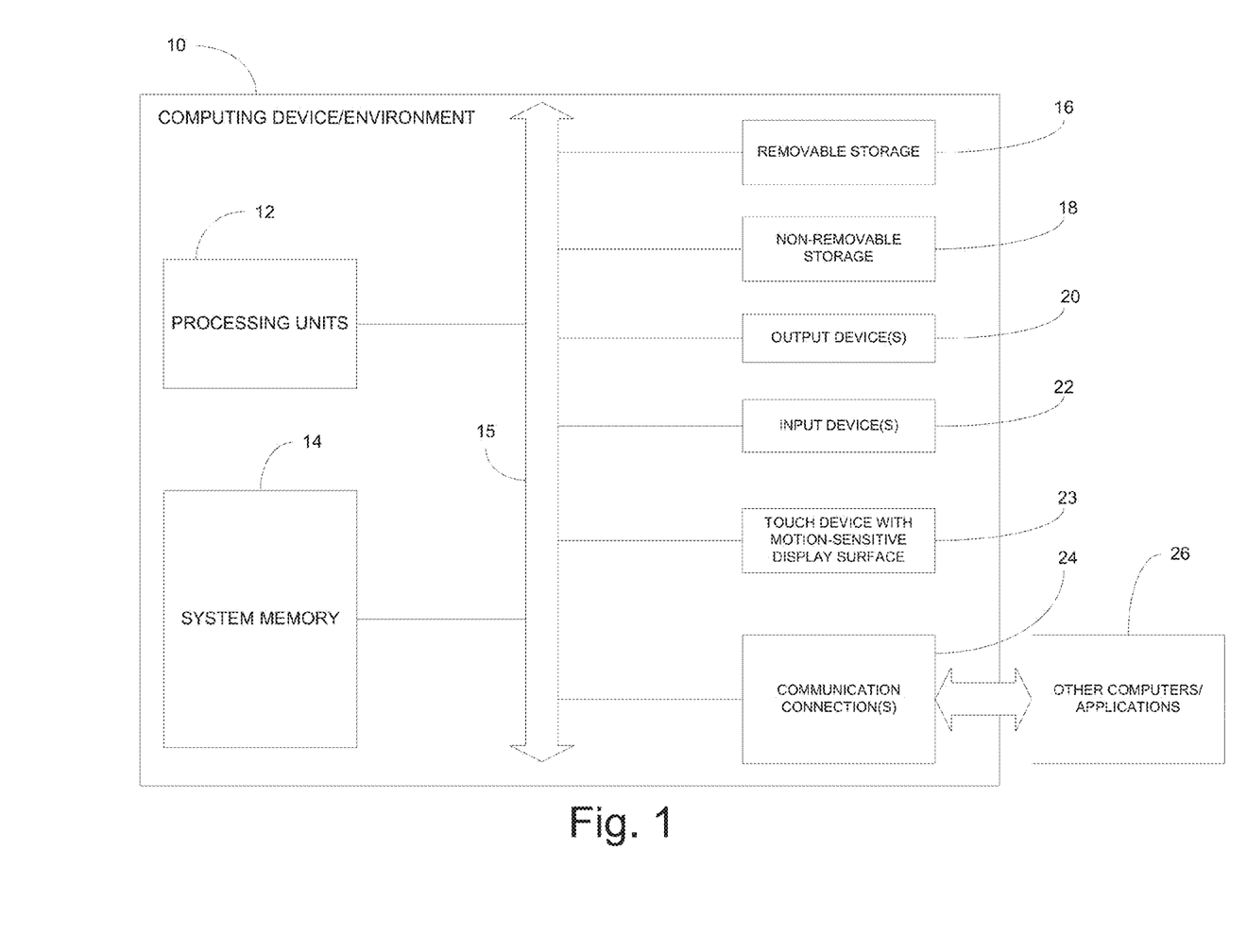
FIG. 1 is a block diagram illustrating a computing environment suitable for implementing aspects of a streaming media system according to one embodiment.

FIG. 1 is a diagram illustrating a computing environment 10 suitable for implementing aspects of a streaming media system according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional or different features/functionality and additional or different hardware and software. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for non-transitory storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such non-transitory computer storage media may be part of computing device 10.

The various elements of computing device 10 are communicatively coupled together via one or more communication links 15. Computing device 10 also includes one or more communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc. In one embodiment, computing device 10 also includes a touch device with a motion-sensitive display surface 23.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
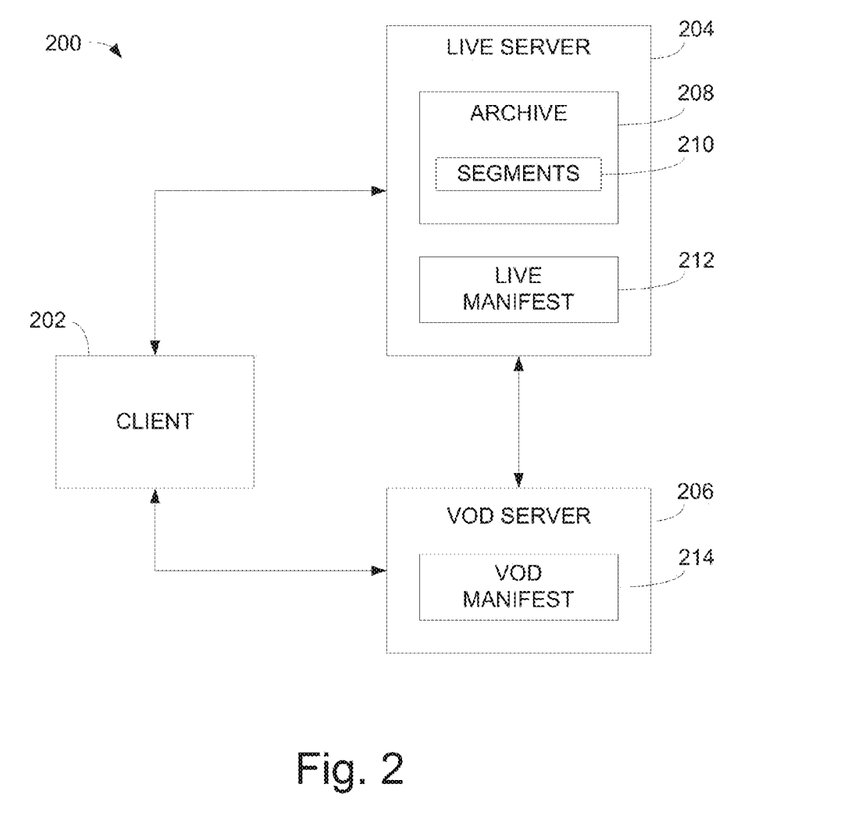
FIG. 2 is a block diagram illustrating a streaming media system according to one embodiment.

FIG. 2 is a block diagram illustrating a streaming media system 200 according to one embodiment. In the illustrated embodiment, streaming media system 200 includes client device 202, live server 204, and video on-demand (VOD) server 206. Streaming media system 200 may include additional or different elements than those shown in FIG. 2, such as a content delivery network (CDN) or cache network. In one embodiment, elements of streaming media system 200 are implemented with computing systems, such as computing system 10 (FIG. 1).

In one embodiment, live server 204 provides a live stream to client 202. In one embodiment, client 202 retrieves a live manifest 212, identifies segments 210 specified within the manifest 212, and prepares the segments for playback. The client 202 may navigate an XML or other document that comprises the manifest 212 and identify the first few chunks to be retrieved from live server 204 to playback the stream, and begin retrieving the chunks. The manifest 212 according to one embodiment identifies one or more segments 210, such as via a hierarchical scheme like that provided by XML. An XML manifest file may include a tag for each segment 210 and sub-tags that identify information about the segments, such as smooth streaming media chunks that comprise the segments and a location for retrieving the chunks.

The client 202 selects a first segment 210 in the manifest 212. The client 202 retrieves the segment information for the first segment 210 from the manifest 212 and identifies one or more chunks associated with the first segment 210. The chunk information may contain a uniform resource locator (URL) for retrieving chunks, bitrate information, and other media information.

The client 202 retrieves one or more chunks associated with the selected segment 210. For example, the client 202 may issue an HTTP GET request to retrieve a chunk associated with a particular URL specified in the manifest 212. In one embodiment, each chunk has a distinguished URL that allows the chunk to be identified and cached by both Internet cache servers and the client's browser cache. These requests are the same ones made for the original source, allowing the client 202 to potentially receive cached assets from earlier requests, thereby increasing efficiency. The client 202 may receive the chunk from one or more origin servers or from a cache server (e.g., if the chunk has been previously requested by other clients).

The client 202 plays one or more retrieved chunks in order. Each chunk may include an MPEG Group of Pictures (GOP), a frame, or other suitable subdivision of a media presentation for transmission in parts from a server to a client. Each chunk contains metadata and media content. The metadata may describe useful information about the media content, such as the bit rate at which the media content was encoded, where the media content fits into a larger media element (e.g., this chunk represents offset 1:10 in a 10 minute video clip), the codec used to encode the media content, and so forth. The client 202 uses this information to place the chunk into a storyboard of the larger media element and to properly decode and playback the media content.

While providing the live stream to client 202, live server 204 also continually archives the live stream in archive 208. In one embodiment, the archive behavior can be controlled by settings in an .isml file for the archive 208. Using these settings, the live server 204 can create a new session folder based on the start date/time every time a publishing point is started (i.e., a per-session archive). However, this may mean the DVR is lost whenever a publishing point is restarted due to a server crash. Alternatively, the live server 204 can use these settings to control the archive behavior to be a single contiguous archive for 24×7 (24 hours a day, seven days a week) scenarios.

In one embodiment, live server 204 records or archives the live stream in segments 210 while streaming the presentation. In one embodiment, the segments 210 have a common, fixed length (e.g., 30 minutes), which is a configurable parameter. Thus, for example, live server 204 begins recording to a new file (i.e., a new segment 210) every 30 minutes, and the old file (i.e., the segment 210 immediately preceding the segment 210 currently being recorded) is available to be moved to VOD server 206.

Live server 204 could use a simple index number for naming the individual segments 210. However, this could be problematic if one of the servers had to go down for a while as the segment names across servers would not match. In one embodiment, each of the segments 210 has an associated segment name that includes a time stamp (instead of an index) representing a start time of the segment 210, so that the names of the segments 210 are consistent across servers. The segment names according to one embodiment look like the following: "Segmentxxxxxxxx", where xxxxxxx represents an absolute time stamp of the first chunk in the segment. In one embodiment, to address the issue of missing fragments or audio/video being earlier/later, the time stamp used in the segment names is rounded off to the nearest multiple of the archive segment length. The segment names are used by the client 202 to compose the segment URLs.

In some embodiments, system 200 provides DVR-like functionality for live media streams. In other words, a user of client device 202 can pause a live stream, seek within the live stream, and so forth, without adding work or state tracking for the server 204. In a live stream, there are several scenarios like a missed scene, a pause to take a break, joining the event late and intending to watch from the start, and so forth that are enabled by the system 200, allowing the user to play media chunks in various orders and at various times. Based on the manifest 212, the system 200 offers the user control over how they watch a live stream. The client 202 includes controls to respond to user actions and manage playback of a live stream in a non-live mode by seeking to various locations in the manifest and requesting the appropriate media chunks. In addition, the client 202 can switch between live and non-live viewing during playback.

In some server designs, the server maintains information about all the fragments within the DVR window in memory, and returns an XML manifest from it. However, supporting a manifest for a 24×7 stream with unlimited DVR in this manner would mean the server would run out of memory. To support a long running server with an infinite client DVR, server 204 uses a live manifest 212 that is segmented. The default live manifest 212 according to one embodiment only returns the two most recent segments 210 in a rough cut editing (RCE) style manifest. A reason that the system returns two or more segments 210 in response to a live URL is to solve the race condition that might arise if the system only returned one segment 210. The problem is that each stream crosses the segment boundary at different times. If the server returned a single segment at a time, then the client could not construct a coherent view of all streams at their current live positions. The live manifest 212 according to one embodiment looks like that shown in the following Pseudo Code Example I:

Pseudo Code Example I

```
<?xml version="1.0"?>
<SmoothStreamingMedia MajorVersion="3" MinorVersion="0"
TimeScale="10000000" IsLive="TRUE" Duration="300000000000000"
LookAheadFragmentCount="2" DVRWindowLength="0" >
  <Segment Url="Segments({starttime})/manifest" StartTime="600000000"
Length="600000000">
    <StreamIndex Type="video" Name="video" Subtype="" Chunks="0"
TimeScale="10000000" Url="QualityLevels({bitrate})/Fragments(video={start
time})" LastTimeStamp="1180347370">
      <QualityLevel Index="0" Bitrate="403000"
CodecPrivateData="000000016742801F965604814F2FFF820001FF284001B7E44
066FF301818006260000626F18E303000C4C0000C4C7FE31C3B42045C00000
00168CA8D48" FourCC="H264" MaxWidth="568" MaxHeight="320"/>
      <QualityLevel Index="1" Bitrate="305000"
CodecPrivateData="000000016742801F96560F0477FE080007F0A10006DF91019
BFCC060600129D000129DBFC638C0C00253A000253B7F8C70ED08117000000
00168CA8D48" FourCC="H264" MaxWidth="480" MaxHeight="272"/>
      <c t="618526144" d="20020000" r="4"/>
      <c t="699236757" d="20020000" r="15"/>
      <c t="1000167370" d="20020000" r="10"/>
    </StreamIndex>
    <StreamIndex Type="audio" Name="audio" Subtype="" Chunks="0"
TimeScale="10000000" Url="QualityLevels({bitrate})/Fragments(audio={start
time})" LastTimeStamp="1180354218">
      <QualityLevel Index="0" Bitrate="64000"
CodecPrivateData="121008C4000020000000000000000000000000000000000000
0000000000000000000001000000000000000000000000000000000000000000000
00000000000000000000000000000000000000000" FourCC="AACL"
AudioTag="255" Channels="2" SamplingRate="44100" BitsPerSample="16"
PacketSize="4"/>
      <c t="618663513" d="19969161" r="2"/>
      <c d="19969161" r="3"/>
      <c d="19969161" r="3"/>
    </StreamIndex>
  </Segment>
  <Segment Url="Segments({starttime})/manifest" StartTime="1200000000"
Length="600000000">
    <StreamIndex Type="video" Name="video" Subtype="" Chunks="0"
TimeScale="10000000" Url="QualityLevels({bitrate})/Fragments(video={start
time})" LastTimeStamp="1321117983">
      <QualityLevel Index="0" Bitrate="403000"
CodecPrivateData="000000016742801F965604814F2FFF820001FF284001B7E44
066FF301818006260000626F18E303000C4C0000C4C7FE31C3B42045C00000
00168CA8D48" FourCC="H264" MaxWidth="568" MaxHeight="320"/>
      <QualityLevel Index="1" Bitrate="305000"
CodecPrivateData="000000016742801F96560F0477FE080007F0A10006DF91019
BFCC060600129D000129DBFC638C0C00253A000253B7F8C70ED08117000000
```

-continued

```
00168CA8D48" FourCC="H264" MaxWidth="480" MaxHeight="272"/>
    <c t="1200367370" d="20020000" r="5"/>
    <c t="1301097983" d="20020000" r="2"/>
  </StreamIndex>
  <StreamIndex Type="audio" Name="audio" Subtype="" Chunks="0"
TimeScale="10000000" Url="QualityLevels({bitrate})/Fragments(audio={start
time})" LastTimeStamp="1321299343">
    <QualityLevel Index="0" Bitrate="64000"
CodecPrivateData="121008C40000200000000000000000000000000000000
00000000000000000000001000000000000000000000000000000000000000
0000000000000000000000000000000000000000" FourCC="AACL"
AudioTag="255" Channels="2" SamplingRate="44100" BitsPerSample="16"
PacketSize="4"/>
    <c t="1200555578" d="19969161" r="3"/>
  </StreamIndex>
 </Clip>
</SmoothStreamingMedia>
```

Each SmoothStreamingMedia element contains one or more StreamIndex elements that specify available streams for the presentation. For example, one stream may represent video data and the other stream may represent audio data. Each StreamIndex element contains one or more QualityLevel elements and "c" elements. The QualityLevel elements describe one or more available bitrates or other quality types available for the StreamIndex parent. The "c" elements describe the available chunks of the media presentation, and include a time specification that designates an offset within the overall presentation where the chunk begins. The final chunk may include a total duration.

In one embodiment, the client 202 can request the manifest for an individual segment 210 using the following URL syntax: "http://server/pubpoint.isml/Segments(<starttime>)/manifest", where "<starttime>" is the start time of the segment 210. When the client 202 requests the manifest for a single segment 210, the manifest contains a single <Segment> tag for that segment 210. In one embodiment, all of the fragment or chunk requests also include the segment prefix, so when making a multi-fragment request, the client 202 only requests the fragments within a given segment. In one embodiment, given a media chunk that spans two or more segments 210, the server chooses one segment 210 to publish the chunk, rather than, for instance, publishing the chunk in every segment 210 that the chunk touches.

The archived VOD manifest 214 according to one embodiment looks like a segmented manifest with a single segment. Regular VOD clients can ignore the <Segment> tag and play the content like on-demand content. Clients running in live mode can use the <Segment> tag to seek through the unlimited DVR. The VOD manifest 214 is also returned when the client 202 request the manifest for a particular segment 210. The VOD manifest 214 according to one embodiment looks like that shown in the following Pseudo Code Example II:

Pseudo Code Example II

```
<?xml version="1.0"?>
<SmoothStreamingMedia MajorVersion="3" MinorVersion="0"
TimeScale="10000000" Duration="560994104">
  <Segment Url="../Segments({starttime})/manifest" StartTime="60000000"
Length="600000000">
    <StreamIndex Type="video" Name="video" Subtype="" Chunks="29"
TimeScale="10000000" LastTimeStamp="560994104">
      <QualityLevel Index="0" Bitrate="230000"
CodecPrivateData="00000001 6742801F96560F0477FE080007F0A10006DF91019
BFCC0604003824000704E7F18E302001C1200038273F8C70ED08117000000016
8CA8D48" FourCC="H264" MaxWidth="480" MaxHeight="272"/>
      <QualityLevel Index="1" Bitrate="403000"
CodecPrivateData="00000001 6742801F965604814F2FFF820001FF284001B7E44
066FF3018180062600006263FF18E303000C4C0000C4C7FE31C3B42045C00000
00168CA8D48" FourCC="H264" MaxWidth="568" MaxHeight="320"/>
      <c t="0" d="20020000" r="14"/>
      <c t="280497052" d="20020000" r="14"/>
      <c t="560994104" d="20020000"/>
    </StreamIndex>
    <StreamIndex Type="audio" Name="audio" Subtype="" Chunks="28"
TimeScale="10000000" LastTimeStamp="540792743">
      <QualityLevel Index="0" Bitrate="64000"
CodecPrivateData="121008C40000200000000000000000000000000000000000
000000000000000000001000000000000000000000000000000000000000000
00000000000000000000000000000000000000" FourCC="AACL"
AudioTag="255" Channels="2" SamplingRate="44100" BitsPerSample="16"
PacketSize="4"/>
      <c t="0" d="20201360"/>
      <c d="19969161" r="3"/>
      <c d="20201361"/>
      <c d="19969161" r="9"/>
    </StreamIndex>
  </Segment>
</SmoothStreamingMedia>
```

Since a sparse fragment may or may not be present in a given manifest segment, the client 202 is provided a way to locate the last manifest segment where a sparse stream chunk is present. This is done by adding a "LastTimeStamp" attribute to the "StreamIndex" element. The "LastTimestamp" shows the last timestamp received for a sparse stream and hence the client 202 can retrieve the corresponding manifest for additional information.

In some embodiments, one or more ingest servers are included in system 200 to ingest encoder media streams. An administrator or content author may create a publishing point that defines a URL at which clients of the ingest servers can find a particular media element (e.g., a live event). For example, the administrator may publish a URL "http://ingserver/pubpoint.isml." The publishing point is used by the encoders to provide new media data to the ingest servers and by origin servers to request media data from the ingest servers. In one embodiment, the following two attributes are included in the publishing point:

(1) archiveBehavior—controls the archive behavior on the server. The allowed values according to one embodiment are:

"session"—each restart of the publishing point creates a new session

"continuous"—the archive persists across restarts of the server (2) clientManifestVersion—controls the format of manifest delivered. The allowed values according to one embodiment are:

"20"—the default manifest with no repeat tag

"22"—the default manifest with a repeat tag for compression

"30"—the segmented manifest (also includes repeat tag compression).

In one embodiment, the publishing point (.isml) file for a 24×7 live archive with infinite DVR would look like that shown in the following Pseudo Code Example III:

Pseudo Code Example III

```
<?xml version="1.0" encoding="utf-8"?>
<smil xmlns="http://www.w3.org/2001/SMIL20/Language">
  <head>
    <meta name="title" content="" />
    <meta name="module" content="liveSmoothStreaming" />
    <meta name="sourceType" content="Push" />
    <meta name="publishing" content="Fragments;Streams;Archives" />
    <meta name="estimatedTime" content="30000000" />
    <meta name="manifestWindowLength" content="0" />
    <meta name="startOnFirstRequest" content="True" />
    <meta name="archiveSegmentLength" content="60" />
    <meta name="lookaheadChunks" content="2" />
    <meta name="formats" content="" />
    <meta name="filters" content="" />
    <meta name="archiveBehavior" content="continuous" />
    <meta name="clientManifestVersion" content="30" />
  </head>
  <body>
  </body>
</smil>
```

Figure 3:
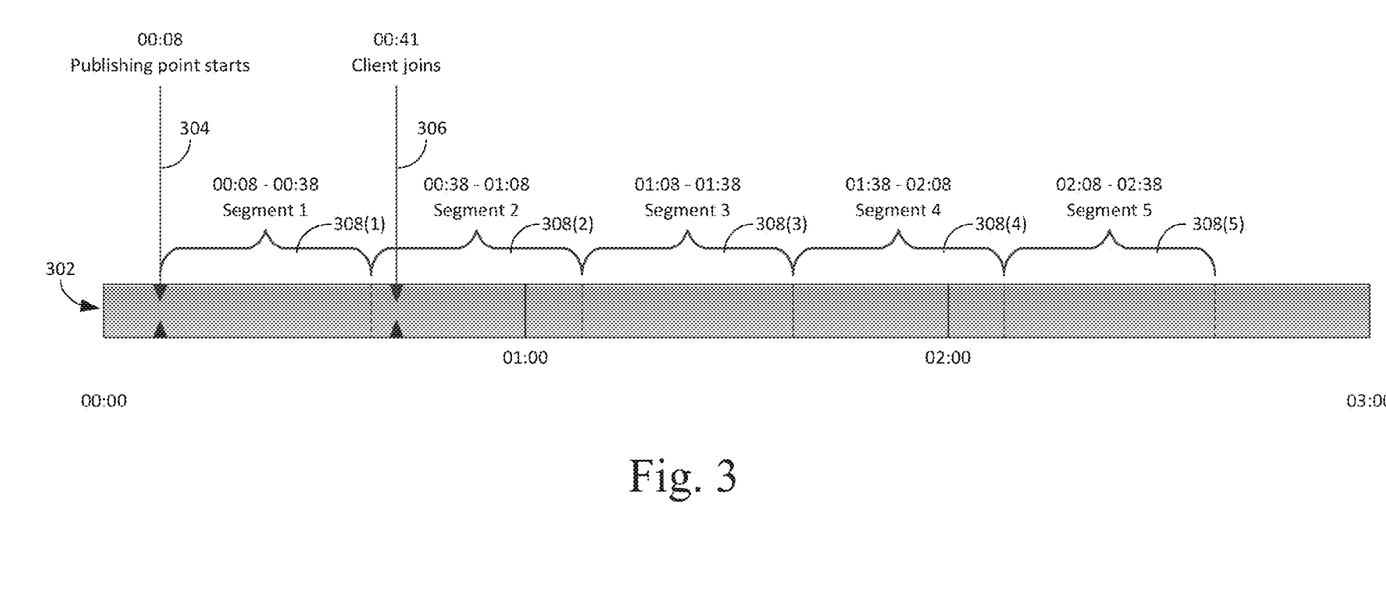
FIG. 3 is a diagram illustrating a scenario in which a client joins a live stream at forty-one minutes after the publishing point according to one embodiment.
Figure 4:
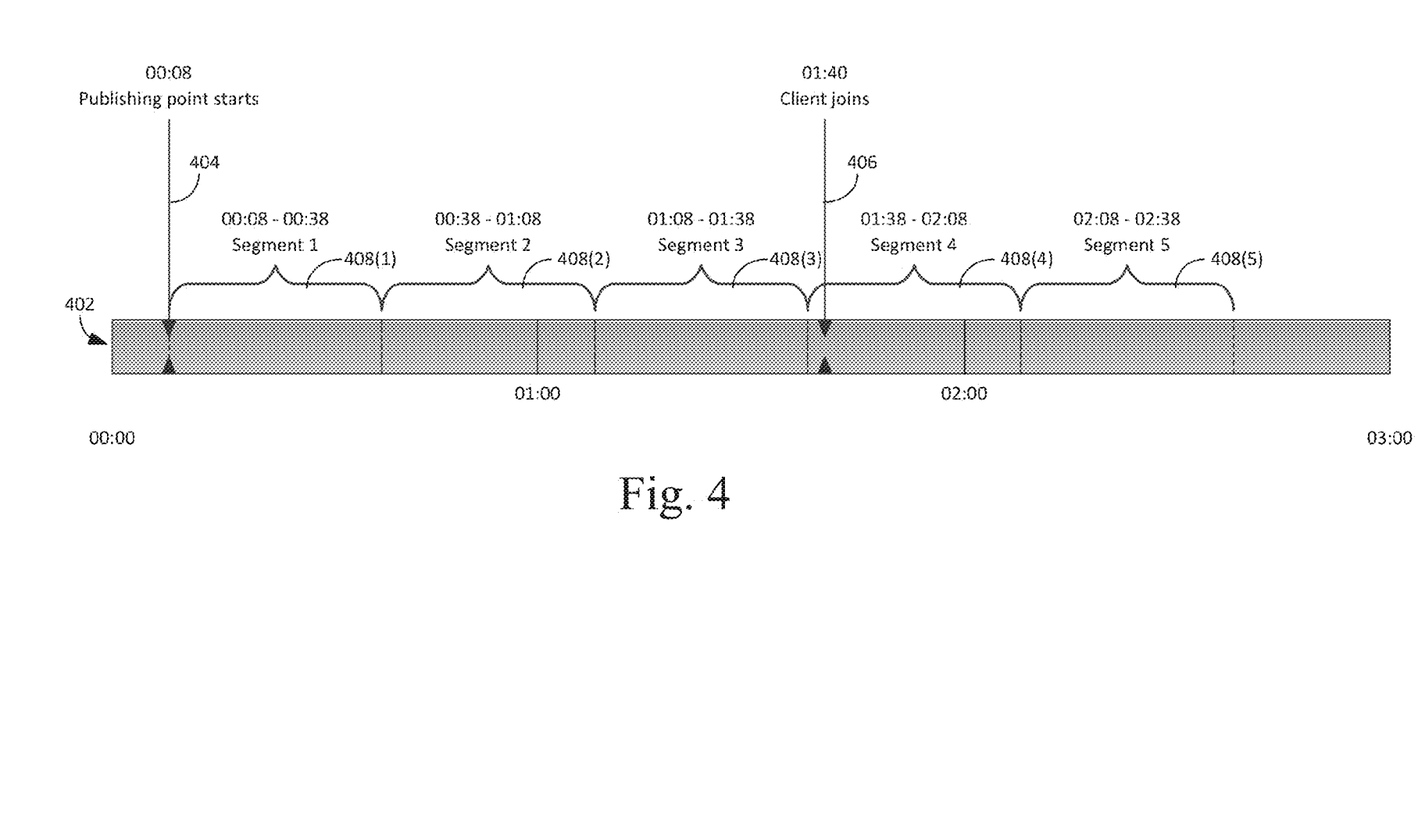
FIG. 4 is a diagram illustrating a scenario in which a client joins a live stream at one hour and forty minutes after the publishing point according to one embodiment.
Figure 5:
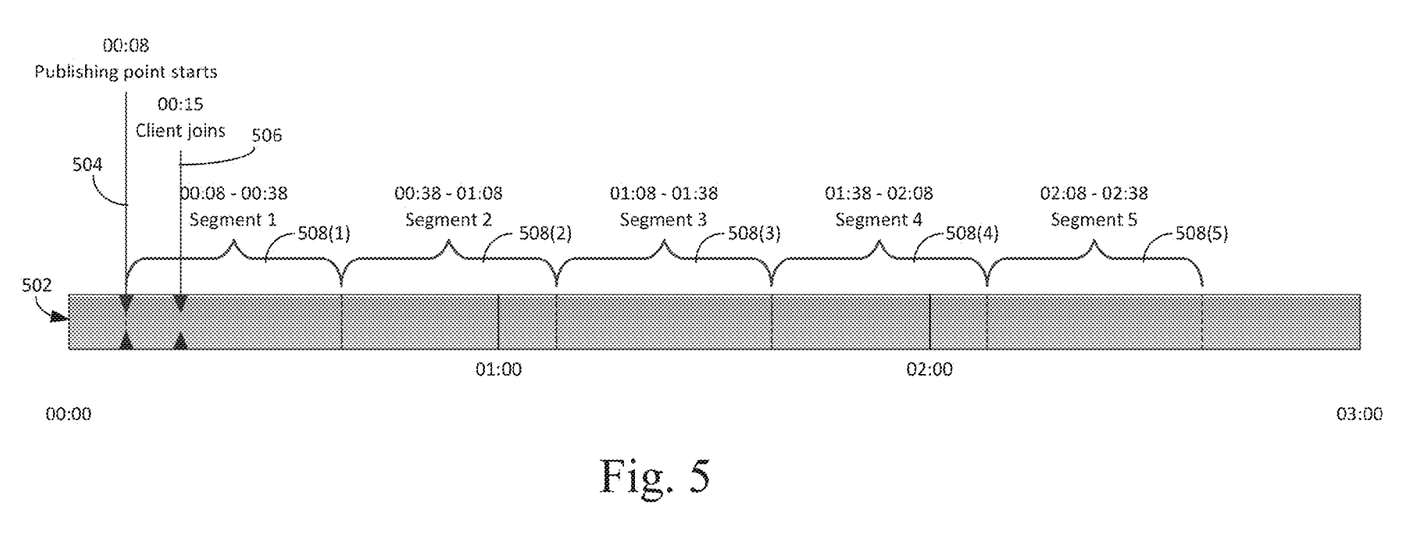
FIG. 5 is a diagram illustrating a scenario in which a client joins a live stream at fifteen minutes after the publishing point according to one embodiment.

FIGS. 3-5 are diagrams illustrating examples with timelines of live to VOD scenarios as they relate to the client 202 according to one embodiment. In these examples, the default value of two segments 210 available from the initial manifest is used.

FIG. 3 is a diagram illustrating a scenario in which a client 202 joins 306 a live stream 302 at forty-one minutes after the publishing point 304 according to one embodiment. The live stream 302 is archived by live server 204 in 30-minute segments 308(1)-308(5) (collectively referred to as segments 308). The publishing point 304 and the first segment 308(1) begin at the eight minute mark. In the illustrated embodiment, the client 202 joins 306 the live stream 302 in the middle of the second segment 308(2). In this embodiment, the client 202 would receive an entire first segment 308(1) and a partial second segment 308(2).

Using the received segments 308, the client 202 is able to seek anywhere between the publishing point start 304 and the current live position. For example, the client 202 knows that each segment 308 is thirty minutes long, and knows the time stamps of the received segments 308. Using this information, the client 202 can keep on subtracting thirty-minutes until the desired location is reached, and the client 202 generates a URL with a segment timestamp corresponding to that location. The segment manifest for that location can then be obtained by the client 202 using the generated URL. In this manner, the client 202 can identify and retrieve manifest information for any segment 308 in the past or in the future, without any additional input from the server.

FIG. 4 is a diagram illustrating a scenario in which a client 202 joins 406 a live stream 402 at one hour and forty minutes after the publishing point 404 according to one embodiment. The live stream 402 is archived by live server 204 in 30-minute segments 408(1)-408(5) (collectively referred to as segments 408). The publishing point 404 and the first segment 408(1) begin at the eight minute mark. In the illustrated embodiment, the client 202 joins 406 the live stream 402 in the middle of the fourth segment 408(4). In this embodiment, the client 202 would receive an entire third segment 408(3) and a partial fourth segment 408(4). Using the received segments 408, the client 202 is able to seek anywhere between the publishing point start 404 and the current live position.

FIG. 5 is a diagram illustrating a scenario in which a client 202 joins 506 a live stream 502 at fifteen minutes after the publishing point 504 according to one embodiment. The live stream 502 is archived by live server 204 in 30-minute segments 508(1)-508(5) (collectively referred to as segments 508). The publishing point 504 and the first segment 508(1) begin at the eight minute mark. In the illustrated embodiment, the client 202 joins 506 the live stream 502 in the middle of the first segment 508(1). In this embodiment, the client 202 would receive a partial first segment 508(1). Using the received segment 508, the client 202 is able to seek anywhere between the publishing point start 504 and the current live position.

In one embodiment, adding the functionality described above to an existing streaming media system does not adversely affect other functionality of the system, such as trick play, scheduling advertisements, switching to a different stream, etc., and the client will continue to behave the same with the respect to errors on chunk downloads, redirections, etc.

Figure 6:
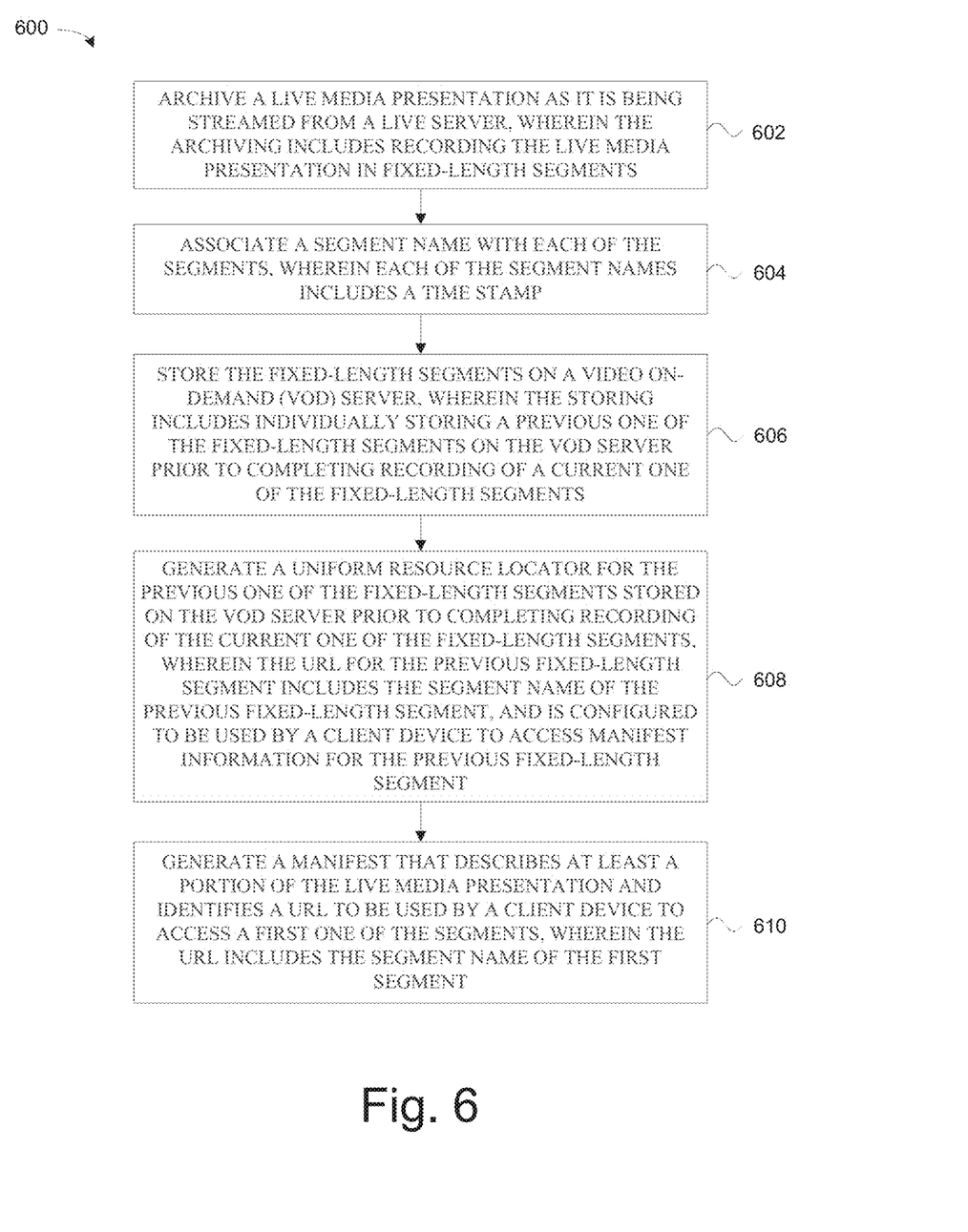
FIG. 6 is a flow diagram illustrating a computer-implemented method for archiving a live media presentation according to one embodiment.

FIG. 6 is a flow diagram illustrating a computer-implemented method 600 for archiving a live media presentation according to one embodiment. In one embodiment, system 200 (FIG. 2) is configured to perform method 600. At 602 in method 600, a live media presentation is archived as it is being streamed from a live server, wherein the archiving includes recording the live media presentation in fixed-length segments. At 604, a segment name is associated with each of the segments, wherein each of the segment names includes a time stamp.

At 606 in method 600, the fixed-length segments are stored on a video on-demand (VOD) server, wherein the storing includes individually storing a previous one of the fixed-length segments on the VOD server prior to completing recording of a current one of the fixed-length segments. At 608, a uniform resource locator (URL) is generated for the previous one of the fixed-length segments stored on the VOD server prior to completing recording of the current one of the fixed-length segments, wherein the URL for the previous fixed-length segment includes the segment name of the previous fixed-length segment, and is configured to be used by a client device to access manifest information for the previous fixed-length segment.

At 610 in method 600, a manifest is generated that describes at least a portion of the live media presentation and identifies a URL to be used by a client device to access a first one of the segments, wherein the URL includes the segment name of the first segment.

In one embodiment of method 600, the steps are performed by at least one processor. The manifest in method 600 according to one embodiment identifies a plurality of chunks associated with the first segment, and the chunks include media content configured to be played by the client device. In one embodiment, the time stamp for each segment is an absolute time stamp. The time stamp for each segment according to one embodiment is a time stamp of a first chunk in the segment. In one embodiment, the URL in method 600 allows the first segment to be received from a cache server storing the first segment following an earlier request for the first segment.

Figure 7:
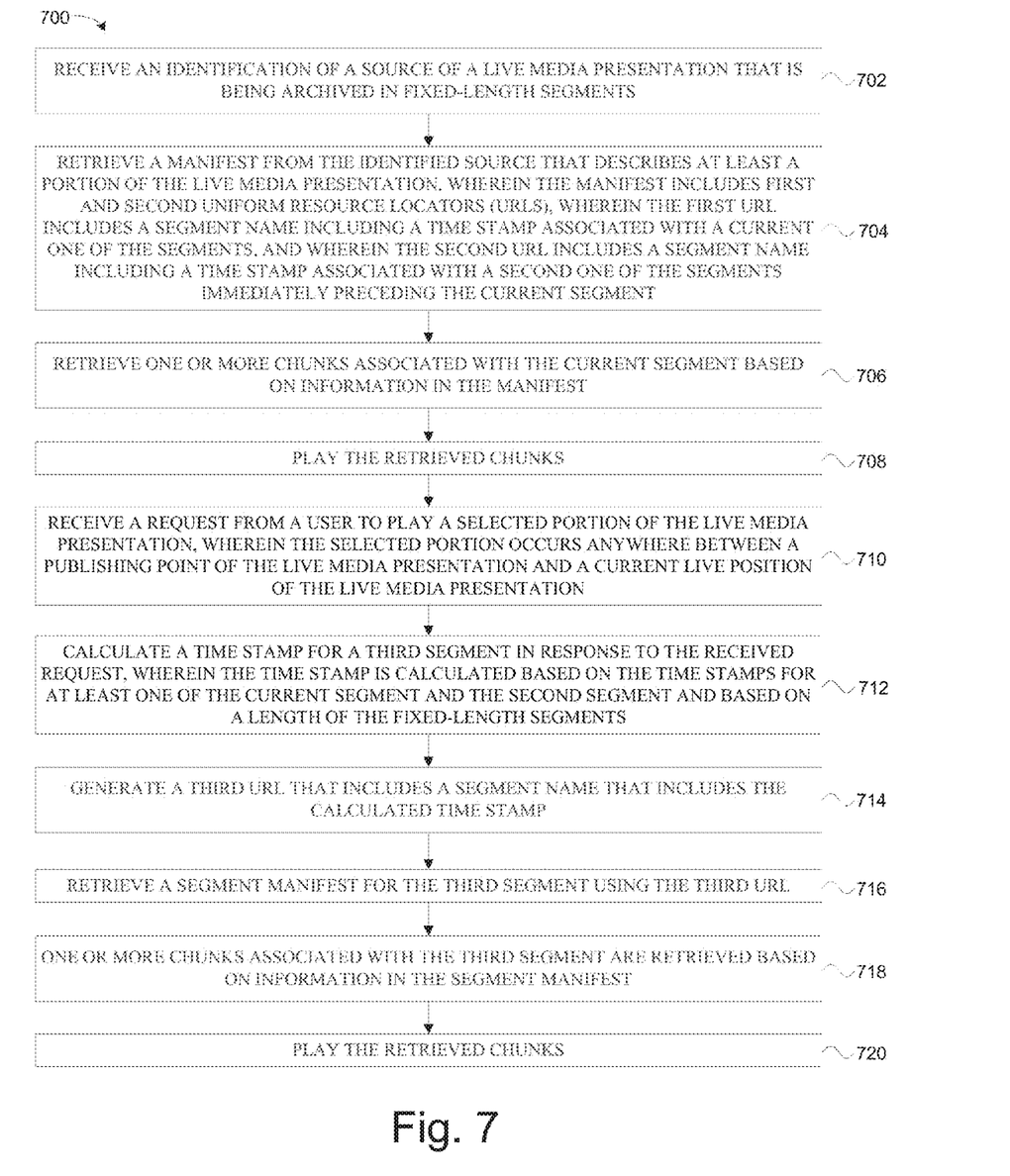
FIG. 7 is a flow diagram illustrating a computer-implemented method for playing a media presentation according to one embodiment.

FIG. 7 is a flow diagram illustrating a computer-implemented method 700 for playing a media presentation according to one embodiment. In one embodiment, system 200 (FIG. 2) is configured to perform method 700. At 702 in method 700, an identification of a source of a live media presentation that is being archived in fixed-length segments is received. At 704, a manifest is retrieved from the identified source that describes at least a portion of the live media presentation, wherein the manifest includes first and second uniform resource locators (URLs), wherein the first URL includes a segment name including a time stamp associated with a current one of the segments, and wherein the second URL includes a segment name including a time stamp associated with a second one of the segments immediately preceding the current segment. At 706, one or more chunks associated with the current segment are retrieved based on information in the manifest. At 708, the retrieved chunks are played. At 710, a request from a user to play a selected portion of the live media presentation is received, wherein the selected portion occurs anywhere between a publishing point of the live media presentation and a current live position of the live media presentation. At 712, a time stamp for a third segment is calculated in response to the received request, wherein the time stamp is calculated based on the time stamps for at least one of the current segment and the second segment and based on a length of the fixed-length segments. At 714, a third URL is generated that includes a segment name that includes the calculated time stamp. At 716, a segment manifest for the third segment is retrieved using the third URL. At 718, one or more chunks associated with the third segment are retrieved based on information in the segment manifest. At 720, the retrieved chunks are played.

In one embodiment of method 700, the steps are performed by at least one processor. The time stamps in method 700 according to one embodiment are absolute time stamps. In one embodiment, the time stamp for the current segment is a time stamp of a first chunk in the current segment, and the time stamp for the second segment is a time stamp of a first chunk in the second segment. In one embodiment, the URLs are configured in a manner that allows the current and second segments to be received from a cache server storing the segments following an earlier request for the segments.

Figure 8:
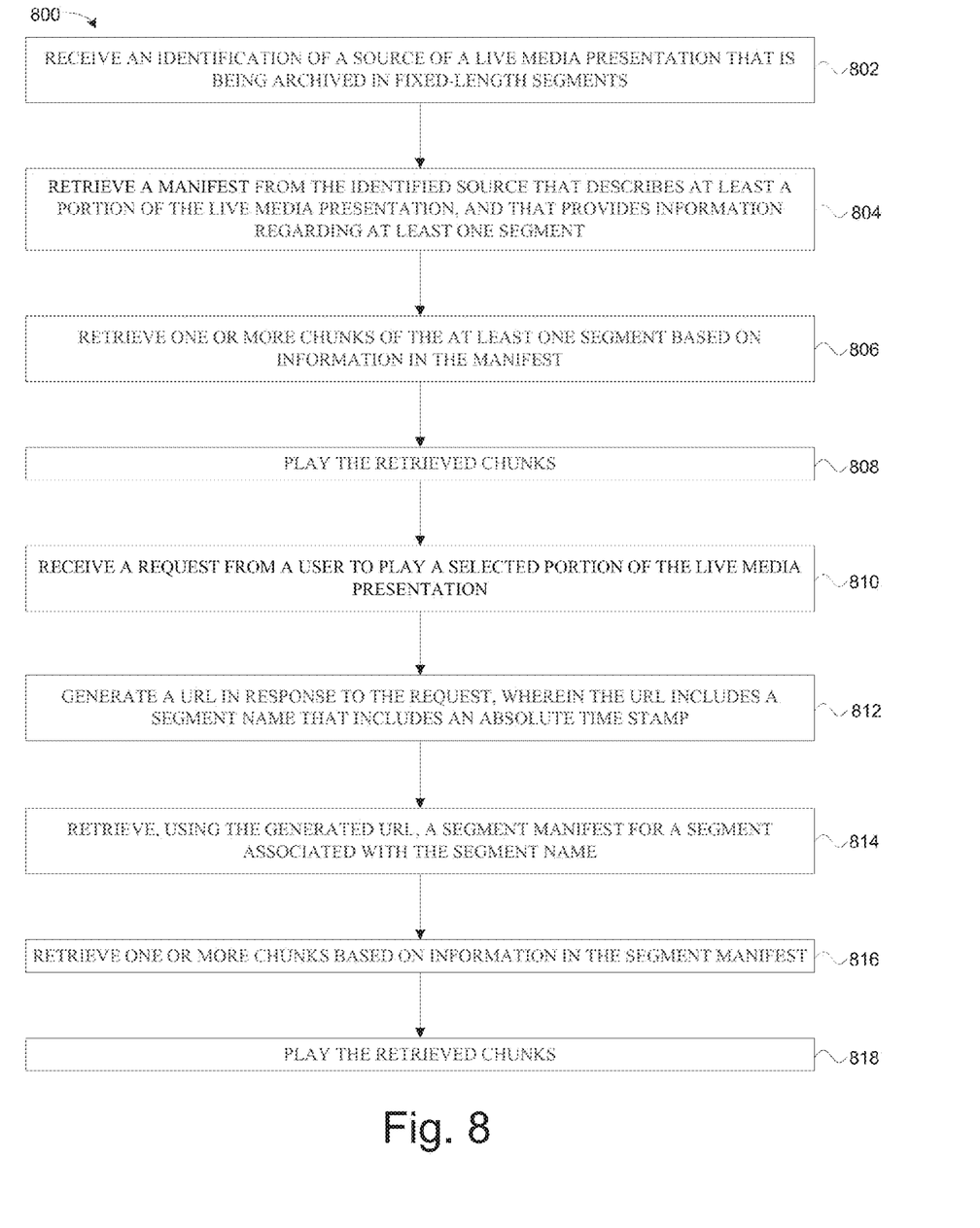
FIG. 8 is a flow diagram illustrating computer-implemented method for playing a media presentation according to another embodiment.

FIG. 8 is a flow diagram illustrating computer-implemented method 800 for playing a media presentation according to another embodiment. In one embodiment, system 200 (FIG. 2) is configured to perform method 800. At 802 in method 800, an identification of a source of a live media presentation that is being archived in fixed-length segments is received. At 804, a manifest is retrieved from the identified source that describes at least a portion of the live media presentation, and that provides information regarding at least one segment. At 806, one or more chunks of the at least one segment are retrieved based on information in the manifest. At 808, the retrieved chunks are played. At 810, a request from a user to play a selected portion of the live media presentation is received. At 812, a URL is generated in response to the request, wherein the URL includes a segment name that includes an absolute time stamp. At 814, using the generated URL, a segment manifest for a segment associated with the segment name is retrieved. At 816, one or more chunks are retrieved based on information in the segment manifest. At 818, the retrieved chunks are played.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-implemented method for archiving a live media presentation, the method comprising:
    archiving the live media presentation as it is being streamed from a live server, wherein the archiving includes recording the live media presentation in fixed-length segments;
    associating a segment name with each of the segments, wherein each of the segment names includes a time stamp in the segment name;
    storing the fixed-length segments on a video on-demand (VOD) server;
    generating a manifest that describes at least a portion of the live media presentation and identifies a uniform resource locator (URL) to be used by a client device to access a first one of the segments, wherein the URL includes the segment name of the first segment, and wherein the segment name of the first segment in the URL includes a time stamp in the segment name; and
    wherein the archiving, associating, storing, and generating are performed by at least one processor.

2. The computer-implemented method of claim 1, wherein the manifest identifies a plurality of chunks associated with the first segment, and wherein the chunks include media content configured to be played by the client device.

3. The computer-implemented method of claim 1, wherein the time stamp for each segment is an absolute time stamp.

4. The computer-implemented method of claim 1, wherein the time stamp for each segment is a time stamp of a first chunk in the segment.

5. The computer-implemented method of claim 1, wherein the URL allows the first segment to be received from a cache server storing the first segment following an earlier request for the first segment.

6. The computer-implemented method of claim 1, wherein storing the fixed-length segments on a VOD server comprises:

individually storing a previous one of the fixed-length segments on the VOD server prior to completing recording of a current one of the fixed-length segments.

7. The computer-implemented method of claim 6, and further comprising:
generating a URL for the previous one of the fixed-length segments prior to completing recording of the current one of the fixed-length segments.

8. The computer-implemented method of claim 7, wherein the URL for the previous fixed-length segment includes the segment name of the previous fixed-length segment, and is configured to be used by the client device to access manifest information for the previous fixed-length segment.

9. A computer-implemented method for playing a media presentation, the method comprising:
receiving an identification of a source of a live media presentation that is being archived in fixed-length segments;
retrieving from the identified source a manifest that describes at least a portion of the live media presentation, wherein the manifest includes first and second uniform resource locators (URLs), wherein the first URL includes a segment name including a time stamp associated with a current one of the segments, and wherein the second URL includes a segment name including a time stamp associated with a second one of the segments immediately preceding the current segment;
retrieving one or more chunks associated with the current segment based on information in the manifest;
playing the retrieved chunks; and
wherein the receiving, retrieving from the identified source, retrieving one or more chunks, and playing are performed by at least one processor.

10. The computer-implemented method of claim 9, wherein the time stamps are absolute time stamps.

11. The computer-implemented method of claim 9, wherein the time stamp for the current segment is a time stamp of a first chunk in the current segment, and wherein the time stamp for the second segment is a time stamp of a first chunk in the second segment.

12. The computer-implemented method of claim 9, wherein the URLs are configured in a manner that allows the current and second segments to be received from a cache server storing the segments following an earlier request for the segments.

13. The computer-implemented method of claim 9, and further comprising:
receiving a request from a user to play a selected portion of the live media presentation, wherein the selected portion occurs anywhere between a publishing point of the live media presentation and a current live position of the live media presentation; and
calculating a time stamp for a third segment in response to the received request, wherein the time stamp is calculated based on the time stamps for at least one of the current segment and the second segment and based on a length of the fixed-length segments.

14. The computer-implemented method of claim 13, and further comprising:
generating a third URL that includes a segment name that includes the calculated time stamp.

15. The computer-implemented method of claim 14, and further comprising:
retrieving, using the third URL, a segment manifest for the third segment.

16. The computer-implemented method of claim 15, and further comprising:
retrieving one or more chunks associated with the third segment based on information in the segment manifest; and
playing the retrieved chunks.

17. A computer-readable storage medium storing computer-executable instructions that when executed by at least one processor cause the at least one processor to perform a method for playing a media presentation, the method comprising:
receiving an identification of a source of a live media presentation that is being archived in fixed-length segments;
retrieving from the identified source a manifest that describes at least a portion of the live media presentation, and that provides information regarding at least one segment;
retrieving one or more chunks of the at least one segment based on information in the manifest;
playing the retrieved chunks;
receiving a request from a user to play a selected portion of the live media presentation;
generating a URL in response to the request, wherein the URL includes a segment name that includes an absolute time stamp; and
retrieving, using the generated URL, a segment manifest for a segment associated with the segment name.

18. The computer-readable storage media of claim 17, wherein the method further comprises:
retrieving one or more chunks based on information in the segment manifest; and
playing the retrieved chunks.

* * * * *